(12) United States Patent
Bassissi et al.

(10) Patent No.: US 6,397,557 B1
(45) Date of Patent: Jun. 4, 2002

(54) PACKAGING MACHINE FOR PRODUCING SEALED PACKAGES OF POURABLE FOOD PRODUCTS

(75) Inventors: Fabio Bassissi, Modena; Giorgio Galavotti, Concordia Sulla Secchia, both of (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/715,119

(22) Filed: Nov. 20, 2000

(30) Foreign Application Priority Data

Jan. 17, 2000 (EP) .............................................. 00830013

(51) Int. Cl.[7] .............................................. B65B 67/02
(52) U.S. Cl. .............................................. 53/51; 53/550
(58) Field of Search .............................. 53/550, 551, 61, 53/51

(56) References Cited

U.S. PATENT DOCUMENTS

| | | | |
|---|---|---|---|
| 4,455,870 A | * | 6/1984 | Kreager et al. ................ 53/451 |
| 4,680,205 A | * | 7/1987 | Lerner et al. .................. 428/28 |
| 4,754,593 A | * | 7/1988 | Ishihara et al. ................. 53/51 |
| 4,876,842 A | * | 10/1989 | Ausnit et al. .................. 53/410 |
| 4,909,018 A | * | 3/1990 | Yamamoto .................... 53/450 |
| 5,782,731 A | * | 7/1998 | Kohn et al. .................... 493/16 |
| 5,861,078 A | | 1/1999 | Huben et al. ................. 156/353 |

FOREIGN PATENT DOCUMENTS

| | | |
|---|---|---|
| EP | 0 850 836 | 7/1998 |
| EP | 0 903 292 | 3/1999 |
| FR | 2 177 295 | 11/1973 |
| GB | 2 060 546 | 5/1981 |

* cited by examiner

*Primary Examiner*—Scott A. Smith
*Assistant Examiner*—Chukwurah Nathaniel
(74) *Attorney, Agent, or Firm*—Burns, Doane, Swecker & Mathis, L.L.P.

(57) ABSTRACT

A packaging machine includes a fixed structure. A number of forming assemblies are arranged successively along a vertical portion of a path of a strip of packaging material, for gradually superimposing opposite lateral portions of the strip to form a tube having a longitudinal axis. A sealing device seals the lateral portions to each other and forms a longitudinal seam of the tube. An actuating device is operatively connected to an angularly adjustable folding member of one of the forming assemblies, and activated selectively to rotate the folding member about the longitudinal axis. A sensor is disposed along the vertical portion of the path, downstream from the sealing device, and generates a position signal correlated to the angular position of the seam. A control unit receives the position signal and generates a control signal, which is supplied to the actuating device to restore the seam to the desired angular position.

9 Claims, 4 Drawing Sheets

PACKAGING MACHINE FOR PRODUCING SEALED PACKAGES OF POURABLE FOOD PRODUCTS

FIELD OF THE INVENTION

The present invention relates to a packaging machine for continuously producing sealed packages of pourable food products.

BACKGROUND OF THE INVENTION

Machines for packaging pourable food products, such as fruit juice, wine, tomato sauce, pasteurized or long-storage (UHT) milk, etc., are known, in which the packages are formed from a continuous tube of packaging material defined by a longitudinally sealed strip.

The packaging material has a multilayer structure comprising a layer of paper material covered on both sides with layers of heat-seal plastic material, e.g. polyethylene, and, in the case of aseptic packages for long-storage products, such as UHT milk, also comprises a layer of barrier material defined, for example, by an aluminium film, which is superimposed on a layer of heat-seal plastic material and is in turn covered with another layer of heat-seal plastic material eventually defining the inner face of the package contacting the food product.

To produce such packages, the strip of packaging material is unwound off a reel and fed through a sterilizing unit, in which it is sterilized, for example, by immersion in a chamber containing a liquid sterilizing agent, normally a concentrated hydrogen peroxide and water solution.

Once the strip has been sterilized, the sterilizing agent is removed, e.g. vaporized by heating, from the surfaces of the packaging material, and the strip of packaging material so sterilized is maintained in a closed sterile environment, and is folded and sealed longitudinally to form a tube.

More specifically, the strip of packaging material is fed vertically through a number of successive forming assemblies, which interact with the strip to fold it gradually into a cylinder. More specifically, the forming assemblies comprise respective roller folding members defining a number of compulsory strip passages varying gradually in section from an open C to a substantially circular shape.

By interacting with the folding members, opposite lateral portions of the strip are superimposed one on top of the other with a ribbon of plastic material, e.g. polyethylene, in between, so as to form a tube of packaging material.

At a sealing station downstream from the folding assemblies, the superimposed lateral portions of the strip are heat sealed to each other to form a longitudinal seam of the tube of packaging material.

In other words, the resulting tube forms an extension of the aseptic chamber, and is filled continuously with the pourable food product and then sent to a forming and (transverse) sealing unit for forming the individual packages and in which the tube is gripped between pairs of jaws to seal the tube transversely and form pillow packs.

The pillow packs are separated by cutting the sealed portions between the packs, and are then fed to a final folding station where they are folded mechanically into the finished shape.

To ensure perfect transverse sealing of the tube of packaging material and correct folding of the pillow packs along respective preformed fold lines on the packaging material, the tube must be fed in a predetermined or desired angular position with respect to its own axis and to the structure of the packaging machine. In particular, when the tube of packaging material is sealed transversely by means of an ultrasonic sealing device, the seam of the tube must engage a respective groove formed in one of the elements opposing the active elements of the sealing device between which the packaging material is gripped under pressure, if not, this may result in incorrect distribution of the contact pressures between the active elements of the sealing device and the packaging material, thus impairing the quality of the seal.

On known packaging machines, the angular position of the tube of packaging material may vary, in actual use, from the desired angular position, due to the lateral edges of the strip not being perfectly straight, and due to the impact of the successive pairs of jaws on the tube.

To minimize the angular shift of the tube of packaging material with respect to the desired angular position, the folding member of one of the forming assemblies is connected to the structure of the packaging machine in angularly adjustable manner about the axis of the tube being formed, so as to enable adjustment of the angular position of the tube. This is done manually, however, by the operator at the start of the cycle and, if necessary, following routine checks of the packages coming off the machine.

The correction made by the operator therefore takes a relatively long time, normally in the region of a few minutes, which, given the high output rate of the packaging machines considered, amounts to a relatively large number of packages being rejected at the end of the cycle.

SUMMARY OF THE INVENTION

It is an object of the present invention to provide a packaging machine for producing sealed packages of pourable food products, designed to eliminate the aforementioned drawbacks typically associated with known machines.

According to the present invention, there is provided a packaging machine for producing sealed packages, containing a pourable food product, from a strip of packaging material fed along a path; said machine comprising:

a fixed structure;

a number of forming assemblies arranged successively along a vertical portion of said path and interacting with said strip of packaging material to fold the strip gradually into a cylinder and superimpose opposite lateral portions of the strip to form a tube of packaging material having a longitudinal first axis;

sealing means for sealing said lateral portions to each other to form a longitudinal seam of said tube of packaging material; and filling means for continuously filling said tube of packaging material with said pourable food product;

at least one of said forming assemblies comprising a folding member defining a compulsory passage for said strip of packaging material being folded, and connected to said fixed structure in angularly adjustable manner about said first axis to adjust the angular position of said tube with respect to the first axis;

characterized by also comprising actuating means connected operatively to said folding member and activated selectively to rotate the folding member about said first axis; sensor means located along said vertical portion of said path, downstream from said sealing means, and generating a position signal correlated to the angular position of said seam with respect to said first axis; and control means receiving said position signal, and generating a first control signal, which is supplied to said actuating means to restore said seam to a desired angular position with respect to said first axis, in the event said position signal differs from a reference value indicating said desired angular position of said seam.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
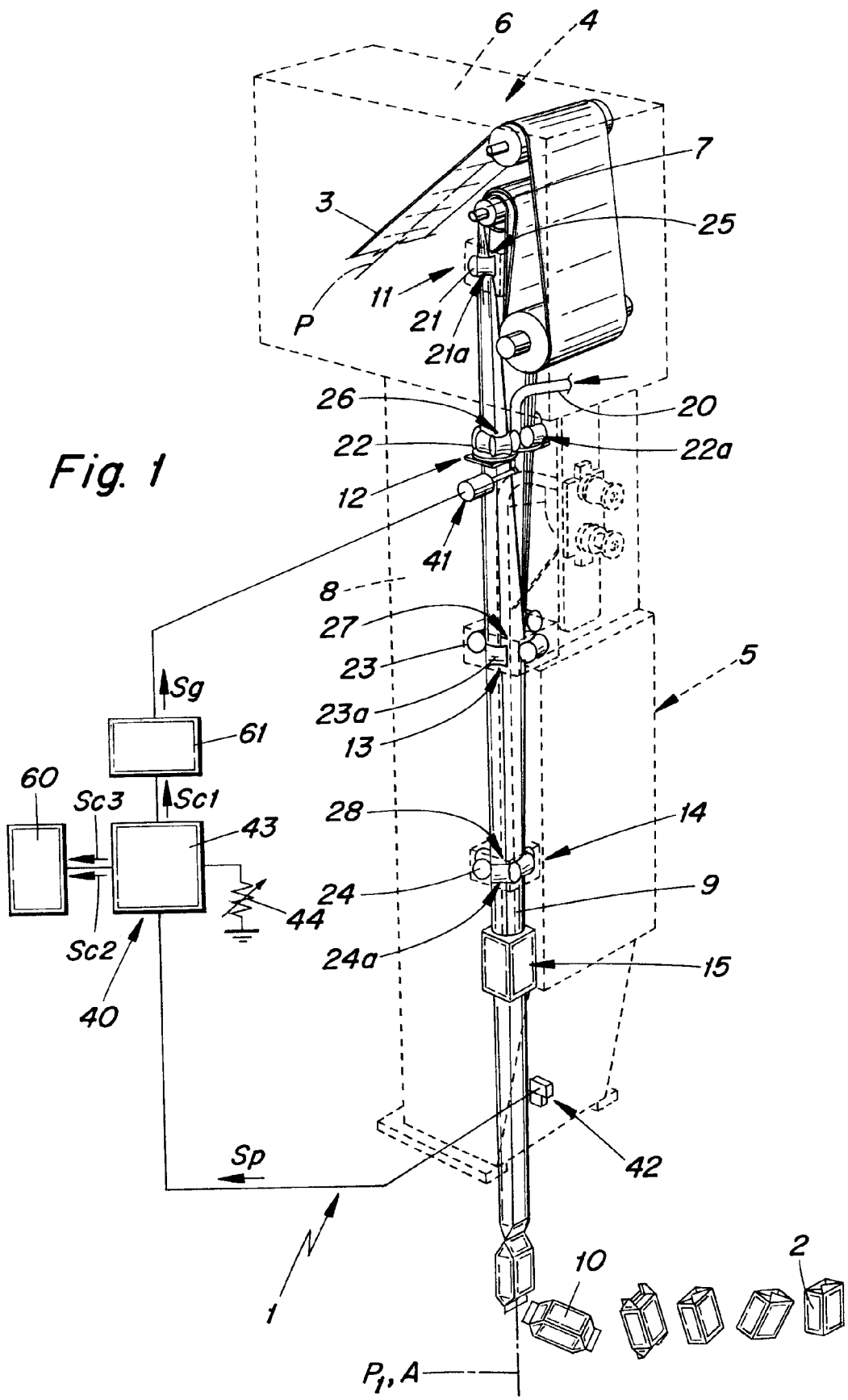
FIG. 1 shows a view in perspective, with parts removed for clarity, of a packaging machine in accordance with the present invention, for producing sealed packages of pourable food products.

Number 1 in FIG. 1 indicates as a whole a packaging machine for continuously producing sealed packages 2, containing a pourable food product, such as pasteurized or UHT milk, fruit juice, wine, etc., from a strip 3 of packaging material unwound off a reel (not shown) and fed along a path P.

More specifically, by means of known guide elements, rollers or similar devices (not shown), strip 3 is fed along path P through a known sterilizing unit (not shown) and a chamber 4 (shown by the dash line in FIG. 1), which is formed in a fixed structure 5 (shown only partly in FIGS. 1 to 3) of machine 1, and in which strip 3 is maintained in a sterile-air environment.

Chamber 4 comprises a top portion 6, which communicates with the sterilizing unit, and in which strip 3 is guided along a vertical portion P1 of path P by a folding roller 7; and a bottom portion or tower 8 extending vertically from top portion 6 along portion P1 of path P.

Inside tower 8, strip 3 is folded longitudinally into a cylinder to form a continuous vertical tube 9 having a longitudinal axis A coaxial with portion P1 of path P, and is gradually formed into a number of sealed packages 10, which are subjected to successive mechanical folding operations (not forming part of the present invention and therefore not shown) to form the finished packages 2.

More specifically, machine 1 comprises a number of known roller forming assemblies 11, 12, 13, 14 carried by structure 5, located along portion P1 of path P inside chamber 4, and interacting with strip 3 to fold the strip gradually into a cylinder and superimpose opposite lateral portions 3a, 3b of strip 3 (FIGS. 2, 3 and 4) to form tube 9 of packaging material. In the example shown, one (11) of the forming assemblies is housed inside top portion 6 of chamber 4, immediately downstream from folding roller 7 along portion P1 of path P, and forming assemblies 12, 13, 14 are located successively along portion P1 of path P inside tower 8.

Figure 4:
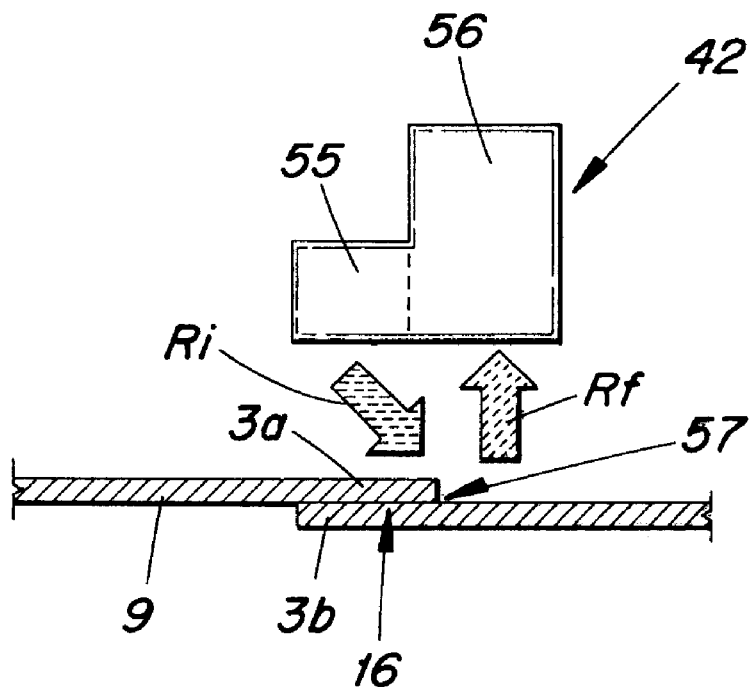
FIG. 4 shows a schematic, larger-scale, top plan view of a position sensor of the FIG. 1 machine.

Machine 1 also comprises a known sealing device 15 (shown schematically in FIG. 1) located along portion P1 of path P, downstream from forming assembly 14, and which provides for sealing the superimposed lateral portions 3a, 3b of strip 3 folded into a cylinder, so as to form a fluidtight longitudinal seam 16 of tube 9 of packaging material (FIG. 4).

The bottom end of tube 9 is filled continuously with the sterilized or sterile-processed food product by means of a pour conduit 20 extending partly inside tube 9 and forming part of a known filling circuit (not shown).

At successive known stations (not shown) along machine 1, tube 9 is then sealed and cut along equally spaced transverse sections to form packages 10 from which packages 2 are produced.

Figure 2:
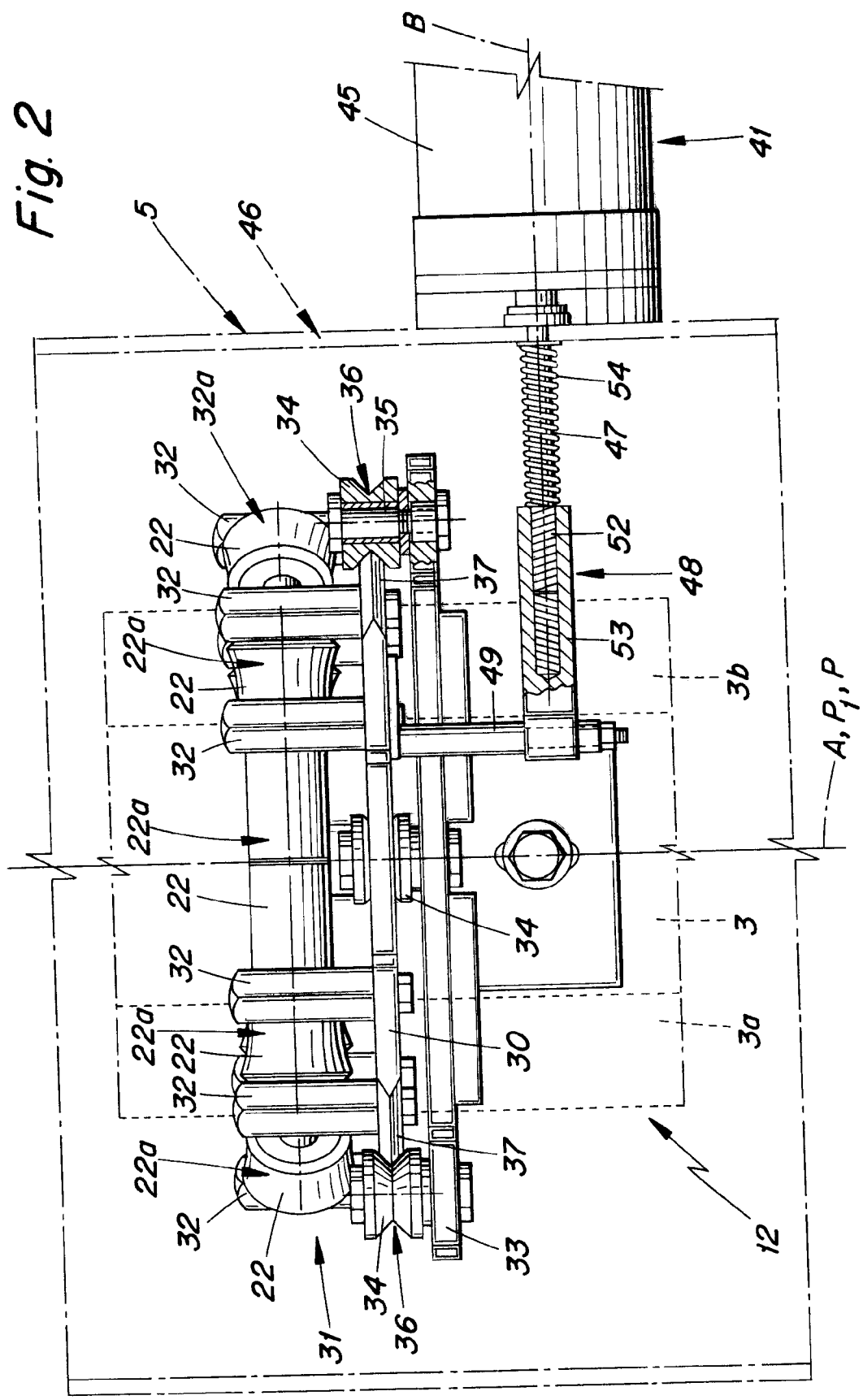
FIG. 2 shows a larger-scale side view of a forming assembly of the FIG. 1 machine.
Figure 3:
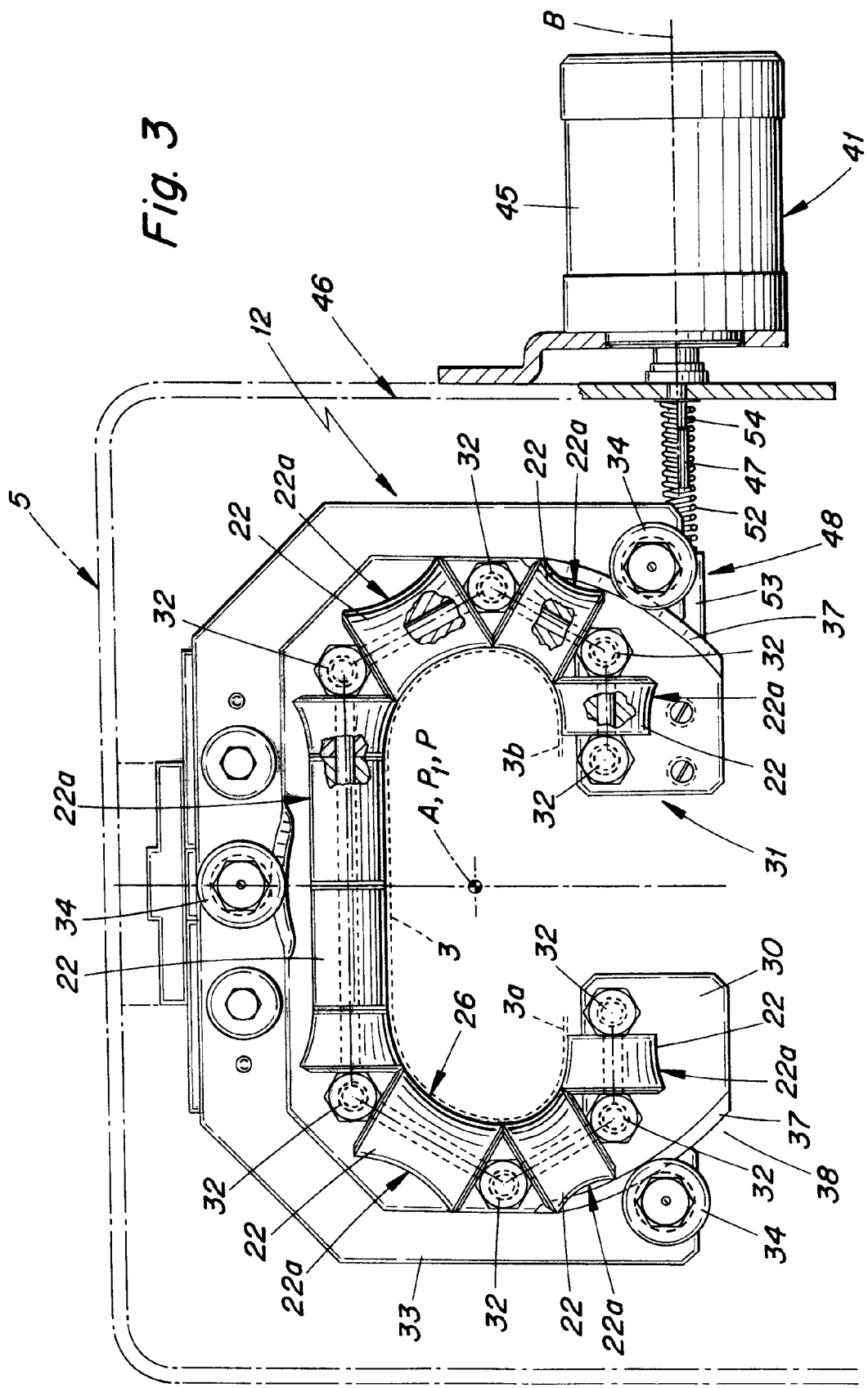
FIG. 3 shows a top plan view of the FIG. 2 forming assembly.

With particular reference to FIGS. 1 to 3, forming assemblies 11, 12, 13, 14 comprise respective numbers of substantially cylindrical folding rollers 21, 22, 23, 24 having axes perpendicular to portion P1 of path P, and the respective lateral surfaces 21a, 22a, 23a, 24a of which define respective successive compulsory passages 25, 26, 27, 28 for strip 3 of packaging material being folded.

More specifically, passages 25, 26, 27, 28 vary gradually in section, along portion P1 of path P, from an open C shape, defined by folding rollers 21 of forming assembly 11, to a substantially circular shape defined by folding rollers 24 of forming assembly 14.

With particular reference to FIGS. 2 and 3, forming assembly 12 differs from forming assemblies 11, 13 and 14 by respective folding rollers 22 being carried by a C-shaped supporting plate 30, which, with rollers 22, defines a folding member 31 connected to structure 5 in angularly adjustable manner about axis A to adjust the angular position of tube 9 being formed with respect to axis A and to structure 5.

More specifically, folding rollers 22 have respective axes parallel to the plane of plate 30, and are each supported in rotary and axially-fixed manner by a respective pair of prismatic, hexagonal-section pins 32 fitted to and projecting perpendicularly from plate 30, so that the axes of folding rollers 22 define, as a whole, a substantially C-shaped broken line.

More specifically, folding rollers 22 are positioned contacting one another at the edges on the side facing passage 26, so that respective lateral surfaces 22a define a continuous surface defining passage 26. The lateral surfaces 22a of folding rollers 22 are also slightly outwardly-concave, at least at the portion contacting the adjacent folding roller/s 22.

Forming assembly 12 also comprises a base plate 33 fitted to structure 5 of machine 1 and having three guide rollers 34, which project from plate 33, are equally spaced angularly about axis A, and support plate 30 of folding member 31 in angularly movable manner.

More specifically, plate 33 is also C-shaped and faces plate 30 on the opposite side to folding rollers 22.

Each guide roller 34 is fitted in rotary and axially-fixed manner to a respective supporting pin 35 fitted to and projecting from plate 33, and has a respective intermediate annular groove 36 having a V-shaped cross section and engaged in sliding manner by a respective cam portion 37 of a peripheral edge 38 of plate 30. More specifically, each cam portion 37 is substantially in the form of an arc of a circle of axis A, and has a profile complementary to that of mating groove 36 of respective guide roller 34. The permitted angular displacement of folding member 31 is defined by the extension of cam portions 37 of peripheral edge 38 of plate 30.

An important aspect of the present invention (FIG. 1) is that machine 1 also comprises a control assembly 40 for controlling the angular position of tube 9 of packaging material being formed with respect to axis A and to structure 5.

Control assembly 40 comprises an actuating device 41 connected operatively to folding member 31 and activated selectively to rotate folding member 31 about axis A; a position sensor 42 located along portion P1 of path P, downstream from sealing device 15, and which is carried by structure 5 and generates a position signal Sp correlated to the angular position of seam 16 of tube 9 with respect to axis A and within the detecting window of sensor 42; and a control unit 43 interfacing a known central control unit (not shown) of machine 1, and which receives position signal Sp and generates a control signal Sc1, which is supplied to actuating device 41 to restore seam 16 of tube 9 to a desired angular position with respect to axis A, when position signal Sp differs from a reference value So indicating the desired angular position of seam 16 and adjustable by means of a potentiometer 44.

More specifically, signal Sc1 is obtained on the basis of position signal Sp by known proportional-integral-derivative (P.I.D.) control not described in detail.

Control signal Sc1 is also correlated to the amount by which position signal Sp generated by sensor 42 departs from reference value So.

With reference to FIGS. 1 to 3, actuating device 41 comprises an electric step motor 45 fitted to and projecting from a wall 46 of structure 5, and having an output shaft 47 rotating about a respective axis B, perpendicular to axis A, and connected by a screw-nut screw transmission 48 to an actuating pin 49 projecting from the periphery of plate 30 and having an axis parallel to axis A.

More specifically, actuating pin 49 projects perpendicularly beyond plate 33 from a free-end portion of plate 30, on the side facing plate 33.

Transmission 48 comprises a screw 52 defined by an externally threaded free-end portion of shaft 47; and a nut screw 53, which is defined by a hollow, internally threaded, cylindrical body engaged by screw 52 and fitted to a free-end portion of actuating pin 49.

Transmission 48 also comprises a slack take-up garter spring 54 wound coaxially about shaft 47 and resting at one end on an end edge of nut screw 53 and, at the opposite end, on wall 46 of structure 5.

When activated, electric motor 45 rotates shaft 47 about axis B and, via transmission 48, moves nut screw 53 axially in opposite directions, depending on the rotation direction of shaft 47.

Since actuating pin 49 is eccentric with respect to axis A, the axial movement of nut screw 53 rotates plate 30 about axis A with respect to plate 33, and, consequently, produces a corresponding rotation of the tube 9 of packaging material being formed and engaged inside passage 26. For greater operating efficiency, provision may also be made for a paper guide (not shown) connected to folding member 31 and contacting the edge of lateral portion 3a or 3b of strip 3.

With particular reference to FIG. 4, sensor 42 (shown schematically) comprises a laser emitter 55 generating an incident beam Ri directed onto seam 16 on the outer surface of tube 9; and a laser receiver 56 for receiving a reflected beam Rf reflected by the outer surface of tube 9, and generating position signal Sp.

More specifically emitter 55 is located to the side of an outer step 57 defined on tube 9 by superimposed lateral portions 3a, 3b of strip 3 at seam 16, is positioned facing the outermost lateral portion 3a of strip 3, and directs incident beam Ri onto step 57 obliquely with respect to seam 16 of tube 9. Receiver 56, on the other hand, is located alongside emitter 55 and extends on the opposite side of step 57 to emitter 55.

Figure 5:
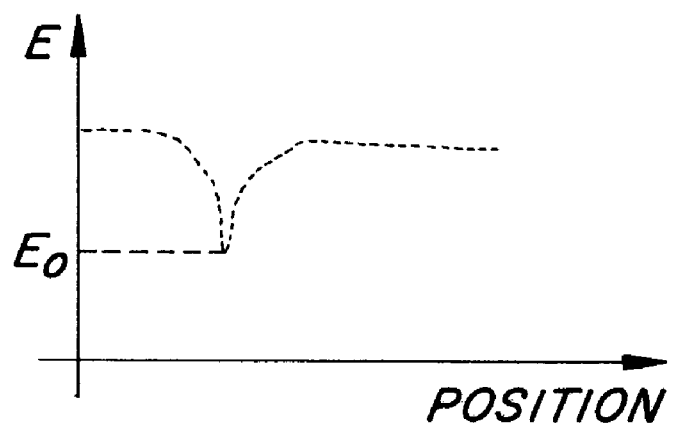
FIG. 5 shows a graph illustrating the operating principle of the FIG. 4 sensor.

FIG. 5 shows a graph of the reflected energy E received by receiver 56 at and in the immediate vicinity of seam 16 of tube 9. As can be seen, reflected energy E is at a minimum value Eo at the outer step 57 on tube 9, which therefore defines a "shadow region" on seam 16.

In the example shown, the position signal Sp generated by sensor 42 is a current signal, the intensity of which is proportional to the position of minimum value Eo of reflected energy E, and therefore to the position of step 57 of tube 9 within the detecting window of sensor 42. In other words, position signal Sp assumes different intensities, depending on the angular position of seam 16 of tube 9 with respect to axis A.

With reference to FIG. 1, control assembly 40 also comprises a display device 60, which receives a control signal Sc2 from control unit 43, and advantageously displays the instantaneous angular position of folding member 31 and the angular position error of tube 9 of packaging material with respect to the desired angular position, which error is represented by a value Sc3 (FIG. 1) equal to the difference between the value assumed by position signal Sp and the reference value So.

Control assembly 40 also comprises a driver circuit 61, which receives control signal Sc1 from control unit 43, and generates a drive signal Sg for electric motor 45.

The advantages of machine 1 according to the present invention will be clear from the foregoing description.

In particular, control assembly 40 enables the angular position of tube 9 of packaging material being formed to be monitored continuously during the operation of packaging machine 1, and to be corrected extremely rapidly in the event of any angular displacement of tube 9 with respect to the desired angular position, thus drastically reducing the number of packages 2 rejected at the end of the cycle.

Clearly, changes may be made to machine 1 as described and illustrated herein without, however, departing from the scope of the accompanying Claims.

What is claimed is:

1. A packaging machine for producing sealed packages, containing a pourable food product, from a strip of packaging material fed along a path; said machine comprising:

a fixed structure;

a number of forming assemblies arranged successively along a vertical portion of said path and interacting with said strip of packaging material to fold the strip gradually into a cylinder and superimpose opposite lateral portions of the strip to form a tube of packaging material having a longitudinal first axis;

sealing means for sealing said lateral portions to each other to form a longitudinal seam of said tube of packaging material;

filling means for continuously filling said tube of packaging material with said pourable food product;

at least one of said forming assemblies comprising a folding member defining a passage for said strip of packaging material being folded, and connected to said fixed structure in angularly adjustable manner about said first axis to adjust the angular position of said tube with respect to the first axis;

actuating means connected operatively to said folding member and activated selectively to rotate the folding member about said first axis;

sensor means located along said vertical portion of said path, downstream from said sealing means, and generating a position signal correlated to the angular position of said seam with respect to said first axis; and control means receiving said position signal, and generating a first control signal, which is supplied to said actuating means to restore said seam to a desired angular position with respect to said first axis, in the event said position signal differs from a reference value indicating said desired angular position of said seam.

2. The machine as claimed in claim 1, wherein said sensor means are carried by said fixed structure, and comprise emitting means for emitting electromagnetic radiation and generating an incident beam directed obliquely onto an outer step of said seam of said tube, defined by superimposing said lateral portions; and receiving means for receiving a reflected beam reflected by said tube.

3. The machine as claimed in claim 2, wherein said emitting means are located to one side with respect to said outer step of said tube, and facing the outermost said lateral portion; and wherein said receiving means extend on the opposite side of said outer step of said tube with respect to said emitting means.

4. The machine as claimed in claim 3, wherein the reflected energy received by said receiving means has a minimum value at said outer step of said tube; and wherein said position signal generated by said sensor means is of an intensity proportional to the position of said minimum value of the reflected energy within the detecting window of the sensor means.

5. The machine as claimed in claim 2, wherein said emitting means comprise a laser emitter.

6. The machine as claimed in claim 1, wherein said actuating means comprise an actuating member movable along a second axis crosswise to said first axis, and connected to said folding member eccentrically with respect to the first axis.

7. The machine as claimed in claim 1, comprising display means receiving a second control signal from said control means to display at least the instantaneous angular position of said folding member with respect to said first axis.

8. A packaging machine for producing sealed packages, containing a pourable food product, from a strip of packaging material fed along a path; said machine comprising:

a fixed structure;

a number of forming assemblies arranged successively along a vertical portion of said path and interacting with said strip of packaging material to fold the strip gradually into a cylinder and superimpose opposite lateral portions of the strip to form a tube of packaging material having a longitudinal first axis;

sealing means for sealing said lateral portions to each other to form a longitudinal seam of said tube of packaging material;

filling means for continuously filling said tube of packaging material with said pourable food product;

at least one of said forming assemblies comprising a folding member defining a passage for said strip of packaging material being folded, and connected to said fixed structure in angularly adjustable manner about said first axis to adjust the angular position of said tube with respect to the first axis;

actuating means connected operatively to said folding member and activated selectively to rotate the folding member about said first axis;

sensor means located along said vertical portion of said path, downstream from said sealing means, and generating a position signal correlated to the angular position of said seam with respect to said first axis;

control means receiving said position signal, and generating a first control signal, which is supplied to said actuating means to restore said seam to a desired angular position with respect to said first axis, in the event said position signal differs from a reference value indicating said desired angular position of said seam;

wherein said actuating means comprise an electric step motor fitted to said fixed structure; and motion-converting means interposed between said electric motor and said actuating member.

9. The machine as claimed in claim 8, wherein said electric motor has an output shaft rotating about said second axis; and wherein said motion-converting means comprise a screw integral with said output shaft, and a nut screw connected to said screw and defining said actuating member.

* * * * *